United States Patent [19]
Ito

[11] Patent Number: 5,315,455
[45] Date of Patent: May 24, 1994

[54] DATA RECORDING/REPRODUCING APPARATUS

[75] Inventor: Hiroshi Ito, Iruma, Japan

[73] Assignee: Kabushiki Kaisha Toshiba, Kawasaki, Japan

[21] Appl. No.: 848,283

[22] Filed: Mar. 9, 1992

[30] Foreign Application Priority Data

Mar. 29, 1991 [JP] Japan ................... 3-066713

[51] Int. Cl.$^5$ ................... G11B 21/02
[52] U.S. Cl. ................... 360/75
[58] Field of Search ................... 360/75

[56] References Cited
FOREIGN PATENT DOCUMENTS 0046422  2/1987  Japan ................... 360/75
0029384  2/1988  Japan ................... 360/75
0251480  10/1989  Japan ................... 360/75

Primary Examiner—Edward K. Look
Assistant Examiner—Christopher Verdier
Attorney, Agent, or Firm—Finnegan, Henderson, Farabow, Garrett & Dunner

[57] ABSTRACT

In a sector servo type magnetic disk apparatus having a carriage lock mechanism for locking a carriage by using magnetic force of a magnet, when a magnetic head placed on a CSS (contact start and stop) zone in contact with a disk is unlocked and moved to a data zone, a driving current supplied to a voice coil motor for driving the carriage is increased at a predetermined rate, until servo data recorded in the data zone is detected.

7 Claims, 5 Drawing Sheets

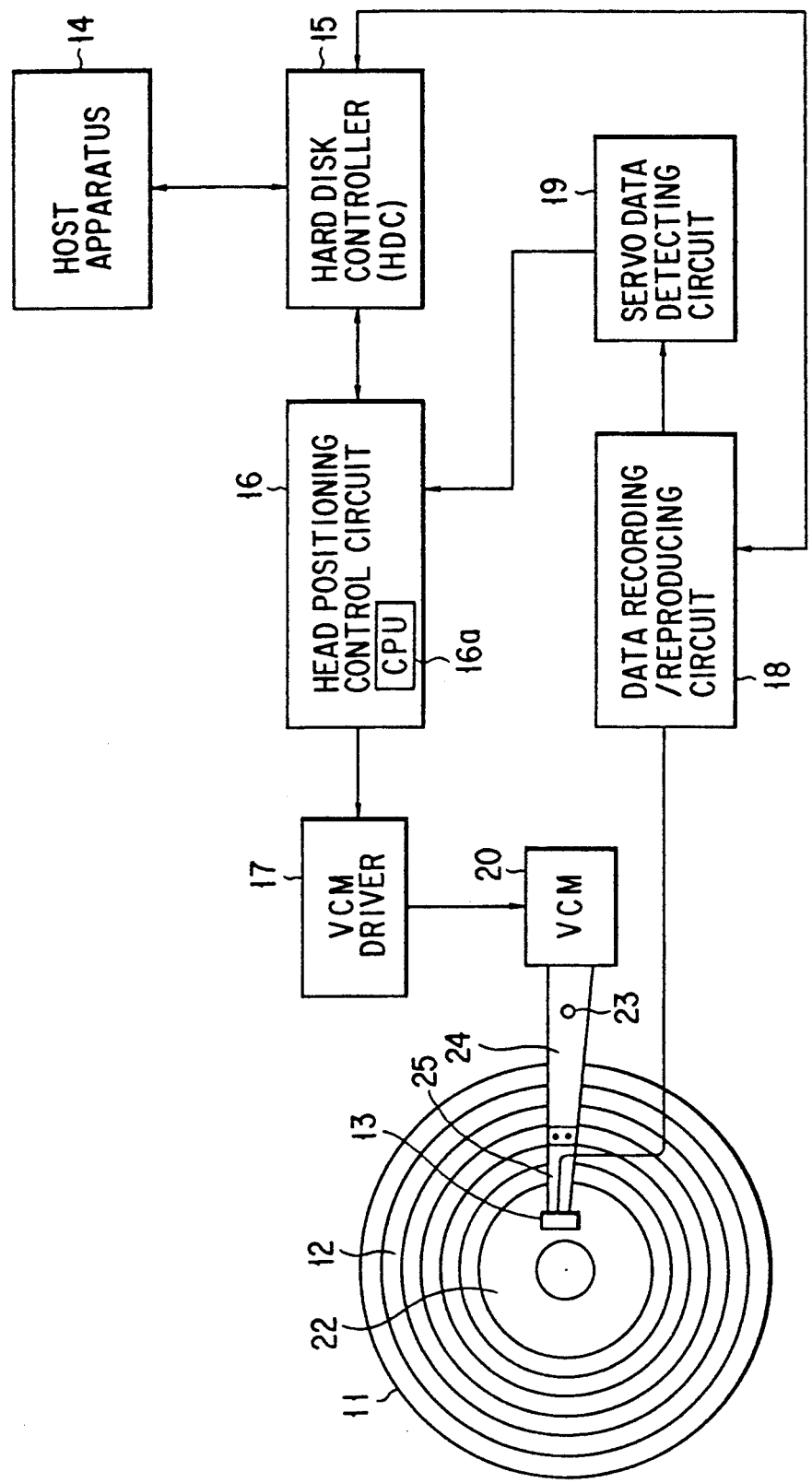
F I G. 2

DATA RECORDING/REPRODUCING APPARATUS

BACKGROUND OF THE INVENTION

1. Field of the Invention

This invention relates to a data recording/reproducing apparatus such as a magnetic disk apparatus, and more particularly to a data recording/reproducing apparatus having a carriage lock mechanism using a magnet.

2. Description of the Related Art

In a magnetic disk apparatus employing the CSS (Contact Start and Stop) method, a CSS zone, i.e., an area other than the data zone, is formed in the innermost portion of a disk (recording medium), to protect the surface of the disk from damage. The magnetic head is placed in contact with the CSS zone when a power source of the magnetic disk apparatus is turned off. The magnetic head is included in a carriage and moves over the disk in accordance with the movement of the carriage. When the power source of the magnetic disk apparatus is turned on and the disk is rotated, the magnetic head is flown from the CSS zone, and then toward the outer portion of the disk, i.e., the data zone.

When the power source of the magnetic disk apparatus is turned off, if the apparatus vibrates, thereby moving the carriage, the magnetic head in contact with the CSS zone may be moved, resulting in damage to the surface of the disk. To prevent this, a lock mechanism for locking the carriage is provided in the magnetic disk apparatus, so that the carriage including the magnetic head on the CSS zone is not easily moved.

For this purpose, a carriage lock mechanism which locks the carriage by utilizing magnetic force of a magnet may be used. This carriage lock mechanism locks the carriage including the magnetic head on the CSS zone by the magnetic force of, for example, the magnet of a voice coil motor (VCM) for moving the carriage. In the carriage lock mechanism, when the magnetic head is moved from the CSS zone to the data zone (this movement is hereinafter referred to as an initial seek operation), the force which releases the carriage from the locked state is applied to the carriage.

In a conventional apparatus, a constant current necessary to generate force for releasing the carriage from its locked state is continuously supplied to the voice coil motor during an initial seek operation. However, as shown in FIG. 1, since the magnetic force (hereinafter referred to as offset force) does not affect the carriage which includes the magnetic head on the data zone relatively large force is applied to the carriage in the direction toward the outer portion of the disk. As a result, the magnetic head cannot detect servo data in the data zone, and may run out of control. Therefore, since the magnetic head and the surface of the disk may be damaged, data recorded on the disk will be destroyed.

Under the circumstances, it is demanded to develop a data recording/reproducing apparatus wherein the carriage is released from the locked state at an initial seek operation without causing the magnetic head to run out of control.

SUMMARY OF THE INVENTION

It is an object of the present invention to provide a data recording/reproducing apparatus wherein the carriage is unlocked without running out of control of the magnetic head.

According to an aspect of the present invention, there is provided a data recording/reproducing apparatus comprising: a recording medium having a CSS (contact start and stop) zone and a data zone prestoring servo data; head means for reading/writing data from/in the recording medium; supporting means for supporting the head means; moving means for moving the supporting means; supplying means for supplying a driving current to the moving means at predetermined time intervals, to move the moving means; locking means for locking the supporting means when the head means is placed on the CSS zone; detecting means for detecting the servo data from data read by the head means from the recording medium; and controlling means for controlling the supplying means so that the driving current supplied to the moving means is increased at a predetermined rate, till the servo data is detected by the detecting means.

According to another aspect of the present invention, there is provided a method of controlling a driving current supplied to a motor for moving a carriage, in a data recording/reproducing apparatus comprising a recording medium having a CSS (contact start and stop) zone and a data zone prestoring servo data, a lock mechanism for locking a carriage for supporting a magnetic head placed on the CSS zone, and the motor for moving the carriage, the method comprising the steps of: supplying the driving current to the motor at predetermined time intervals to move the carriage, when the magnetic head is to be moved from the CSS zone to the data zone; and determining whether the servo data is detected by the magnetic head from the recording medium, wherein the driving current for driving the motor is increased at a predetermined rate, until the servo data is detected from the recording medium.

Additional objects and advantages of the invention will be set forth in the description which follows, and in part will be obvious from the description, or may be learned by practice of the invention. The objects an advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a diagram showing a sector servo type magnetic disk apparatus according to an embodiment of the present invention;

DETAILED DESCRIPTION OF THE PREFERRED EMBODIMENT

An embodiment of the present invention will now be described with reference to the accompanying drawings.

FIG. 2 shows a sector servo type magnetic disk apparatus according to an embodiment of the present invention. In the magnetic disk apparatus, the CSS (contact start and stop) method and the carriage lock method are employed.

Figure 1:
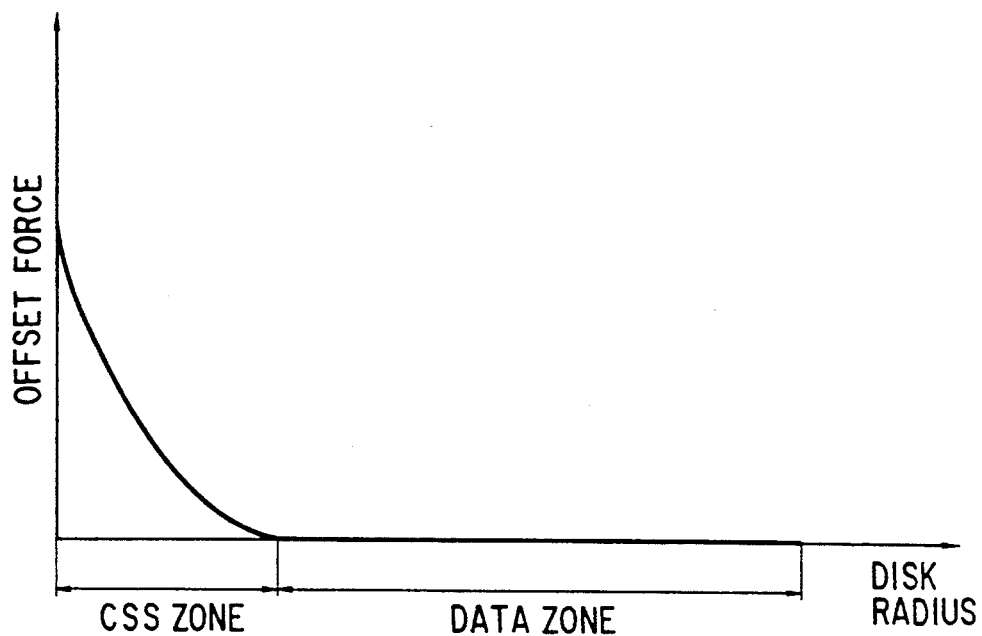
FIG. 1 is a diagram showing distribution of offset force in the radial direction of a disk.
Figure 3:
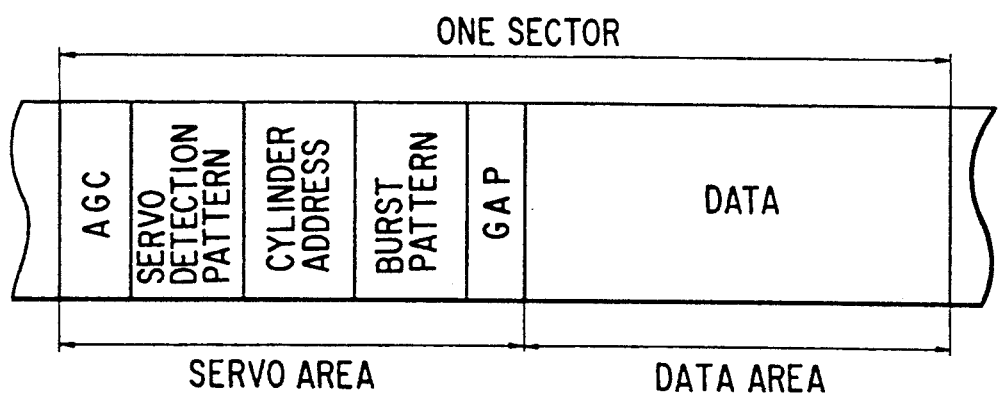
FIG. 3 is a schematic diagram showing a data format of a sector in the data zone.

A disk (recording medium) 11 has a data zone 12 and a CSS zone 22. The data zone 12 includes concentric data tracks (called cylinders). Each cylinder is divided into a plurality of sectors. As is shown in FIG. 3, each sector has a servo area and a data area. Servo data is recorded in the servo area, and data which the user reads and writes is recorded in the data area. Servo data includes servo detection pattern data for detecting the servo area, cylinder address data for identifying the cylinder, and burst pattern data for positioning a magnetic head 13 at the center of the cylinder. Servo detection pattern data has data pattern which does not appear in data which the user writes in and reads out from the data area.

In the CSS method, the CSS zone 22 is formed in a central portion of the disk 11. When the magnetic disk apparatus is in the off state and the disk 11 is not rotated, the magnetic head 13 is positioned in contact with the CSS zone 22 of the disk 11. No data is recorded in the CSS zone 22.

A swing arm 24 is pivoted at a pivot 23. The magnetic head 13 is coupled to one end of the swing arm 24 through a suspension 25. A voice coil motor (VCM) 20 is coupled to the other end of the swing arm 24. The swing arm 24 is pivoted by a voice coil motor 20, the magnetic head 13 is moves over the disk 11 in accordance with the movement of the swing arm 24, thereby recording/reproducing data in/from the disk 11. A carriage may include the magnetic head 13, the suspension 25, the swing arm 23, and the voice coil motor 20.

In the carriage lock mechanism, when the magnetic head 13 is placed on the CSS zone 22, the carriage including the magnetic head 13 is locked by magnetic force, so that the magnetic head 13 cannot move due to, for example, vibration of the apparatus. This locking operation is performed by a magnet (not shown) of the voice coil motor 20.

A host apparatus 14 outputs a seek command, a read command, and a write command to a hard disk controller (HDC) 15.

The hard disk controller 15 controls the overall operations of the magnetic disk apparatus, for example, positioning control of the magnetic head and recording and reproducing control of data, in response to a command output from the host apparatus 14. In this embodiment, the hard disk controller 15 instructs a head positioning control circuit 16 to start moving of the magnetic head 13 from the CSS zone 22 to the data zone 12, i.e., to start an initial seek operation.

The head positioning control circuit 16 includes a CPU (central processing unit) 16a and outputs a control signal to a VCM driver 17 under control of the hard disk controller 15 in order to position the magnetic head 13 into a target cylinder. The CPU 16a controls first and second current supply operations which will be described later.

The VCM driver 17 supplies a driving current to a voice coil motor 20 in response to a control signal output from the CPU 16a.

A servo data detecting circuit 19 detects servo data from reproduced data obtained by a data recording/reproducing circuit 18. When the servo data detecting circuit 19 detects servo data, it outputs detection data, indicating that the servo data is detected, to the head positioning control circuit 16.

Figure 4:
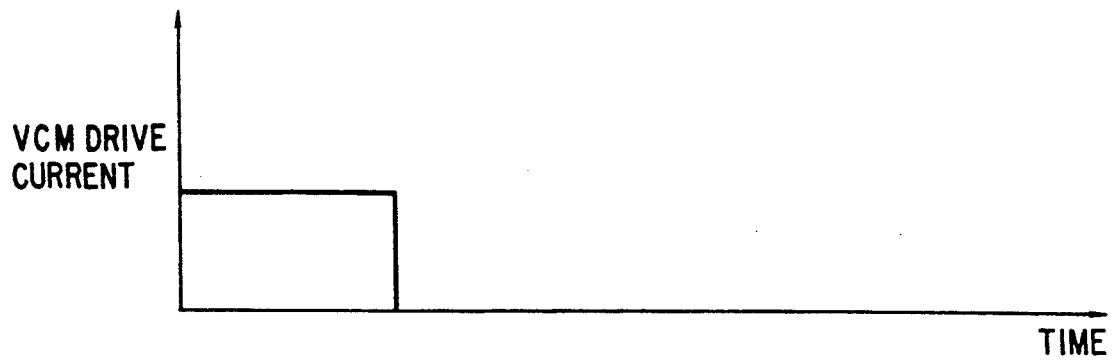
FIG. 4 is a diagram for explaining current supply to the voice coil motor of a conventional magnetic disk apparatus at an initial seek operation.

FIG. 4 is a diagram for explaining current supply to the voice coil motor during an initial seek operation in a conventional magnetic disk apparatus. As shown in FIG. 4, in the conventional magnetic disk apparatus, a constant current necessary for generating force to unlock the carriage is continuously supplied to the voice coil motor during an initial seek operation. The time of current supply is, for example, 7 to 10 ms.

In contrast, according to the present invention, current is supplied in the manner described below.

Figure 5:
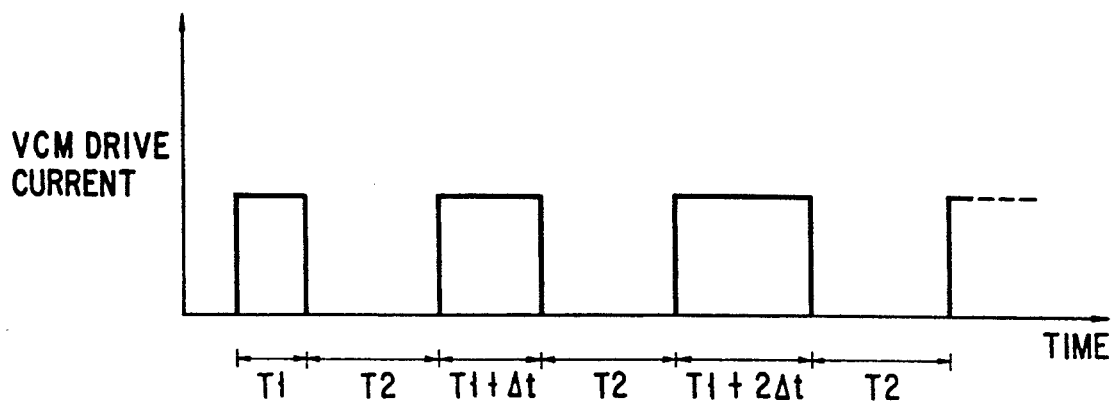
FIG. 5 is a diagram for explaining first current supply to the voice coil motor of the magnetic disk apparatus at an initial seek operation, according to the present invention.
Figure 6:
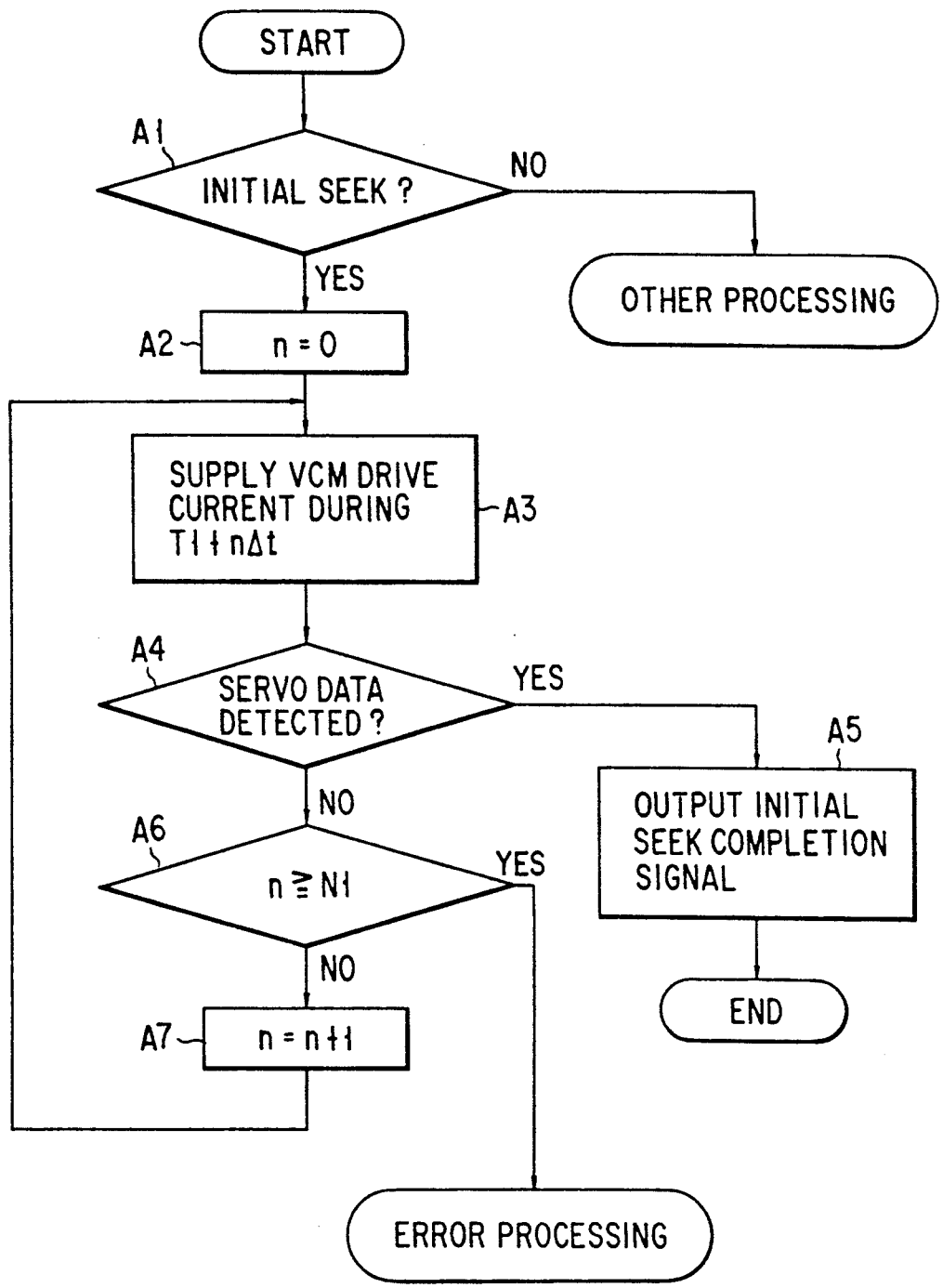
FIG. 6 is a flowchart for executing the first current supply as shown in FIG. 5.

FIG. 5 is a diagram for explaining first current supply to the voice coil motor during an initial seek operation in this embodiment. In FIG. 5, $T1+n\Delta t$ (n is an integer) is the time in which a current is supplied to the voice coil motor 20, and T2 is the time in which current supply to the voice coil motor 20 is stopped ($T2 \geq 100$ ms). T1 is a standard current supply time (e.g., 3 ms) and $\Delta t$ is an additional current supply time (e.g., 0.5 ms). FIG. 6 is a flowchart for executing the first current supply as shown in FIG. 5.

When the magnetic disk apparatus is turned on, with the result that the disk 11 starts rotating and the number of rotations of the disk 11 reaches a predetermined value, the hard disk controller 15 outputs an initial seek start command from the host apparatus 14 to the head positioning control circuit 16. The CPU 16a of the head positioning control circuit 16 controls the first current supply operation in accordance with the flowchart shown in FIG. 6 and in response to the command output from the hard disk controller 15.

In step A1, it is determined whether a command from the hard disk controller 15 is the initial seek start command. If NO, another process, such as a normal seek operation, is performed.

If, in step A1, it is determined that the command is the initial seek start command, since the value of n is set to 0 in step A2, a predetermined VCM driving current is supplied from the VCM driver 17 to the voice coil motor 20 for the period of time T1 in step A3.

If the carriage is unlocked by the voice coil motor 20 driven by the VCM driving current, the magnetic head 13 can move from the CSS zone 22 to the data zone 12.

In step A4, it is determined whether servo data is detected. The CPU 16a determines this on the basis of whether detection data is output from the servo data detecting circuit 19. If the magnetic head 13 moves to the data zone 12, servo data is detected from reproduced data read from the data zone 12 by the magnetic head 13 in the servo data detecting circuit 19. Servo data to be detected is servo detection pattern data for detecting a servo area.

If, in step A4, it is determined that servo data is detected, the CPU determines that the magnetic head 13 has been moved to the data zone 12. Therefore, an initial seek completion signal indicating completion of the initial seek operation is output to the hard disk controller 15 (step A5).

In contrast, if it is determined that servo data is not detected, the CPU determines that the magnetic head has not been moved to the data zone 12 but is still positioned in the CSS zone 22. In other words, the carriage is still locked. In this case, the value of n is incremented by 1 in step A7, and step A3 and subsequent steps are repeated, thereby successively increasing the supply time of the VCM driving current to the voice coil motor 20 to T1+$\Delta$t, T1+2$\Delta$t, etc., until servo data is detected in step A4. Accordingly, the force for moving the carriage toward the outer portion of the disk 11 increases successively. As is shown in FIG. 5, the current supply is stopped during T2.

In step A6, it is determined whether the value of n is N1 or greater than N1. N1 is set in accordance with the maximum acceptable supply time (e.g., 5 to 7 ms). If n is N1 or greater than N1 in step A6, the CPU determines that the carriage cannot be unlocked, and error processing is executed.

As has been described above, in the first current supply control, the magnetic head 13 is moved from the CSS zone 22 to the data zone 12 and the time during which the VCM driving current is supplied to the voice coil motor 20 is successively increased as shown in FIG. 5, until servo data is detected, thereby gradually increasing the force which is applied to the carriage. As a result, the magnetic head 13 is prevented from running out of control, and consequently, the magnetic head 13 and the surface of the disk 11 are protected from damage.

Figure 7:
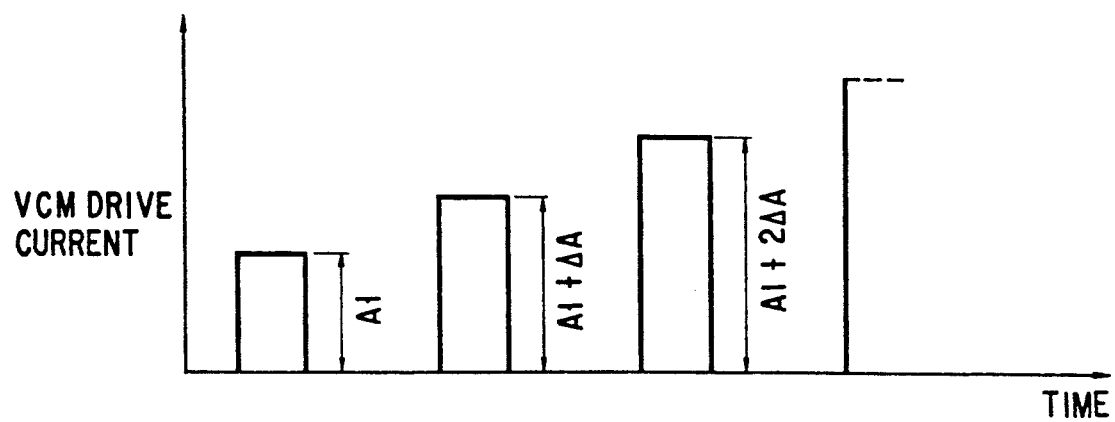
FIG. 7 is a diagram for explaining second current supply to the voice coil motor of the magnetic disk apparatus at an initial seek operation, according to the present invention.
Figure 8:
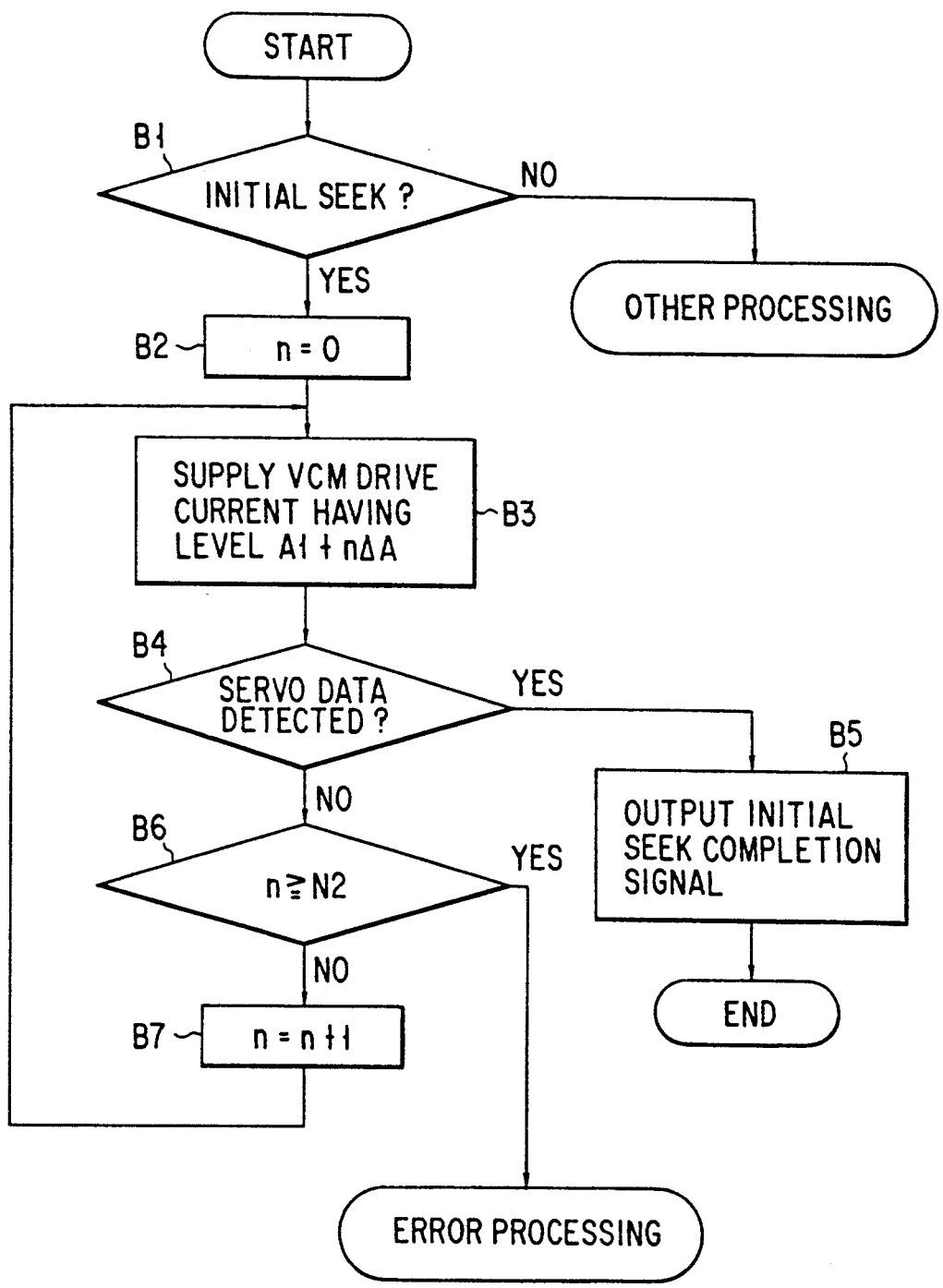
FIG. 8 is a flowchart for executing the second current supply as shown in FIG. 7.

FIG. 7 is a diagram for explaining the second current supply to the voice coil motor of the magnetic disk apparatus at an initial seek operation according to the embodiment of the present invention. In FIG. 7, A1+n$\Delta$A (n is an integer) is the level (amplitude) of a current supplied to the voice coil motor 20. A1 is the standard level of the current, and $\Delta$A is the additional level of the current. FIG. 8 is a flowchart for executing the second current supply operation shown in FIG. 7.

When the power source of the magnetic disk apparatus is turned on, with the result that the disk 11 starts rotating, and the number of rotations of the disk 11 reaches a predetermined value, the hard disk controller 15 outputs an initial seek start command from the host apparatus 14 to the head positioning control circuit 16. The CPU 16a of the head positioning control circuit 16 controls the second current supply operation in accordance with the flowchart shown in FIG. 8 and in response to the command output from the hard disk controller 15.

In step B1, it is determined whether a command from the hard disk controller 15 is the initial seek start command. If NO, another process, such as a normal seek operation, is performed.

If in step B1 it is determined the command is the initial seek start command, since the value of n is set to 0 in step B2, the VCM driving current of the level A1 is supplied from the VCM driver 17 to the voice coil motor 20 in step B3.

If the carriage is unlocked by the voice coil motor 20 driven by the VCM driving current of the level A1, the magnetic head 13 can move from the CSS zone 22 to the data zone 12.

In step B4, it is determined whether servo data is detected. The CPU 16a determines this on the basis of whether detection data is output from the servo data detecting circuit 19. If the magnetic head 13 moves to the data zone 12, servo data is detected from reproduced data read from the data zone 12 by the magnetic head 13 in the servo data detecting circuit 19. Servo data to be detected is servo detection pattern data for detecting a servo area.

If, in step B4, it is determined that servo data is detected, the CPU determines that the magnetic head 13 has been moved to the data zone 12. Therefore, an initial seek completion signal indicating completion of the initial seek operation is output to the hard disk controller 15 (step B5).

In contrast, if it is determined that servo data is not detected, the CPU determines that the magnetic head has not been moved to the data zone 12 but is positioned in the CSS zone 22. In other words, the carriage is still locked. In this case, the value of n is incremented by 1 in step B7, and step B3 and subsequent steps are repeated, thereby successively increasing the level of the VCM driving current supplied to the voice coil motor 20 to A1+$\Delta$A, A1+2$\Delta$A, etc., until servo data is detected in step B4. Accordingly, the force for moving the carriage toward the outer portion of the disk 11 increases successively.

In step B6, it is determined whether the value of n is N2 or greater than N2. N2 is a value which is set in accordance with the maximum acceptable supply level. If n is N2 or greater than N2 in step B6, the CPU determines that the carriage cannot be unlocked, and an error processing is executed.

As has been described above, in the second current supply control operation, the magnetic head 13 is moved from the CSS zone 22 to the data zone 12 and the level of the VCM driving current supplied to the voice coil motor 20 is successively increased as shown in FIG. 5, until servo data is detected, thereby gradually increasing the force which is applied to the carriage. As a result, the magnetic head 13 is prevented from running out of control, and consequently, the magnetic head 13 and the surface of the disk 11 are protected from damage.

In the first and second current supply control, the value of n obtained when the carriage is unlocked in an initial seek operation can be stored in a memory. If, in the next initial seek operation, the supply time of the VCM driving current and the level of the VCM driving current are set by using the stored value of n, an initial seek operation can be executed within a shorter period of time.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data recording or reproducing apparatus comprising:
    a recording medium having a data zone prestoring servo data and a contact start and stop zone;
    head means for reading or writing data from or in the recording medium;
    supporting means for supporting the head means;
    moving means for moving the supporting means;

supplying means for supplying a driving current to the moving means;

locking means for locking the supporting means when the head means is placed on the contact start and stop zone;

detecting means for detecting the servo data from data read from the data zone by the head means; and controlling means for controlling the supplying means so that the driving current is supplied to the moving means at predetermined time intervals when the head means is moved to the data zone from the contact tart and stop zone, the driving current being increased at a predetermined rate until the servo data is detected by the detecting means.

2. The data recording or reproducing apparatus according to claim 1, wherein a supply time of the driving current supplied to the moving means at the predetermined time intervals is successively increased by the control means.

3. The data recording or reproducing apparatus according to claim 1, wherein a level of the driving current supplied to the moving means at the predetermined time intervals is successively increased by the control means.

4. A method of controlling a driving current supplied to a motor for moving a carriage in a data recording or reproducing apparatus comprising a recording medium having a data zone prestoring servo data and a contact start and stop zone, a carriage for supporting a magnetic head, a lock mechanism for locking the carriage when the magnetic head is placed on the contact start and stop zone, and the motor for moving the carriage, the method comprising the steps of:

supplying the driving current to the motor at predetermined time intervals to move the carriage, when the magnetic head is moved to the data zone from the contact start and stop zone;

determining whether the servo data has been read out from the recording medium by the magnetic head; and increasing the driving current supplied to the motor at a predetermined rate until the servo data is read out from the recording medium by the magnetic head.

5. The method according to claim 4, wherein a supply time of the driving current supplied to the motor at the predetermined time intervals is successively increased.

6. The method according to claim 4, wherein the level of the driving current supplied to the motor at the predetermined time intervals is successively increased.

7. An apparatus according to claim 1, wherein the moving means is a voice coil motor.

* * * * *

UNITED STATES PATENT AND TRADEMARK OFFICE
CERTIFICATE OF CORRECTION

PATENT NO.   : 5,315,455
DATED        : May 24, 1994
INVENTOR(S)  : Hiroshi Ito

It is certified that error appears in the above-identified patent and that said Letters Patent is hereby corrected as shown below:

Claim 1, Column 7, Line 13, change "tart" to --start--.

Signed and Sealed this

Twenty-eight Day of February, 1995

Attest:

BRUCE LEHMAN

*Attesting Officer*    *Commissioner of Patents and Trademarks*